(12) United States Patent
Leung

(10) Patent No.: US 8,632,273 B2
(45) Date of Patent: Jan. 21, 2014

(54) WATER DRAINING PIPE AND DRAINING METHOD THEREOF

(76) Inventor: YiuTak Leung, Kwai Chung (HK)

( * ) Notice: Subject to any disclaimer, the term of this patent is extended or adjusted under 35 U.S.C. 154(b) by 299 days.

(21) Appl. No.: 12/601,006

(22) PCT Filed: May 9, 2008

(86) PCT No.: PCT/CN2008/000914
§ 371 (c)(1),
(2), (4) Date: Nov. 19, 2009

(87) PCT Pub. No.: WO2008/138218
PCT Pub. Date: Nov. 20, 2008

(65) Prior Publication Data
US 2011/0174378 A1    Jul. 21, 2011

(30) Foreign Application Priority Data

May 10, 2007    (CN) .......................... 2007 1 0074351

(51) Int. Cl.
*E02B 11/00*    (2006.01)

(52) U.S. Cl.
USPC .................. 405/36; 405/39; 405/43; 405/45; 405/47

(58) Field of Classification Search
USPC ............... 405/36, 39, 43, 45, 47, 50, 80, 118, 405/119, 124; 137/561 A; 138/38, 39, 116
See application file for complete search history.

(56) References Cited

U.S. PATENT DOCUMENTS

| 535,809 | A | * | 3/1895 | Blanchard | 405/47 |
| 1,259,833 | A | * | 3/1918 | Burns | 285/294.2 |
| 2,029,920 | A | * | 2/1936 | Gutman | 405/47 |
| 5,520,481 | A | * | 5/1996 | Atchley et al. | 405/43 |
| 5,921,711 | A | * | 7/1999 | Sipaila | 405/45 |
| 6,046,685 | A | * | 4/2000 | Tubel | 340/853.2 |
| 2002/0057945 | A1 | * | 5/2002 | Dahowski et al. | 405/118 |

FOREIGN PATENT DOCUMENTS

| WO | WO 81/01579 | * | 6/1981 |
| WO | WO 81/01580 | * | 6/1981 |

* cited by examiner

*Primary Examiner* — Sean Andrish

(57) ABSTRACT

A water draining method comprises water draining adapted for roads, mountains, mountainsides, protective hillsides, retaining walls, grass slopes, airport runways, highways, football fields, grass slopes, stone dams, embankments, landfills, farms, irrigating and draining systems, characterized in that: a. installing receiving members in a pervious bed; b. arranging draining pipes in the receiving members; c. disposing draining ditches on one or two ends of a drain tube; d. drawing excessive water to the draining pipes by using drawing ports of the drain tube and draining the water into the draining ditch via an end portion of the drain tube. Thereby, the present invention allows to obtain rain collecting, impurities filtering, irrigating, draining, anti-leaking, and warning functions.

19 Claims, 11 Drawing Sheets

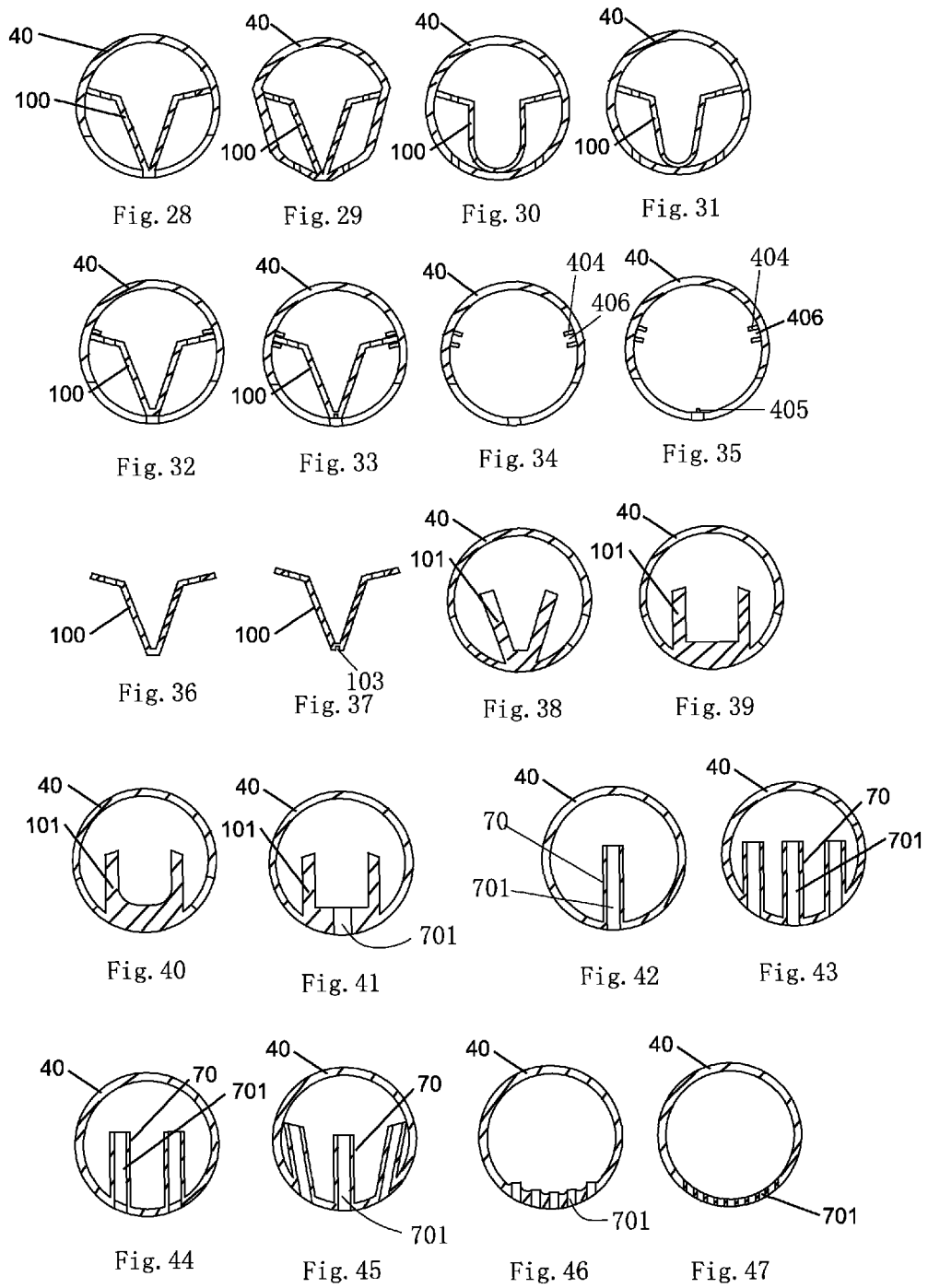

WATER DRAINING PIPE AND DRAINING METHOD THEREOF

BACKGROUND OF THE INVENTION

1. Field of the Invention

The present invention relates to a water draining method and the draining pipe adapted for roads, mountains, mountainsides, protective hillsides, retaining walls, grass slopes, airport runways, highways, football fields, grass slopes, stone dams, embankments, landfills, farms, irrigating and draining systems.

2. Description of the Prior Art

Conventional water draining system used in roads includes draining ditches disposed therein to communicate with drain wells, however such a conventional water draining system can not effectively drain water during raining season.

Besides, the water draining structure are not be used in agriculture, forestry, mountains, mountainsides, protective hillsides, retaining walls, grass slopes, airport runways, highways, football fields, stone dams, and embankments.

The present invention has arisen to mitigate and/or obviate the afore-described disadvantages.

SUMMARY OF THE INVENTION

The primary object of the present invention is to provide a water draining method and the draining pipe adapted for roads, mountains, mountainsides, protective hillsides, retaining walls, grass slopes, airport runways, highways, football fields, grass slopes, stone dams, embankments, landfills, farms, irrigating and draining systems. Thereby, the present invention allows to obtain rain collecting, impurities filtering, irrigating, draining, anti-leaking, and warning functions.

A water draining method comprises water draining adapted for roads, mountains, mountainsides, protective hillsides, retaining walls, grass slopes, airport runways, highways, football fields, grass slopes, stone dams, embankments, landfills, farms, irrigating and draining systems, characterized in that: a. installing receiving members in a pervious bed; b. arranging draining pipes in the receiving members; c. disposing draining ditches on one or two ends of a drain tube; d. drawing excessive water to the draining pipes by using drawing ports of the drain tube and draining the water into the draining ditch via an end portion of the drain tube. Thereby, the present invention allows to obtain rain collecting, impurities filtering, irrigating, draining, anti-leaking, and warning functions.

A draining pipe comprises an outer pipe part and a plurality of external apertures disposed on an outer wall thereof, wherein the outer pipe part includes a main flowing passageway mounted therein, and the main flowing passageway includes a number of internal apertures fixed on a predetermined portion higher than the external apertures.

BRIEF DESCRIPTION OF THE DRAWINGS

FIGS. 28-29 are a cross sectional view showing different shapes of the draining pipe of FIG. 13;

FIGS. 30-31 are a cross sectional view of the groove of FIG. 13;

FIGS. 32-33 are a cross sectional view of the water draining passage and the groove of FIG. 13;

FIGS. 34-35 are a cross sectional view of the water draining passage of FIG. 13;

FIGS. 36-37 are a cross sectional view showing various grooves of FIG. 13;

FIGS. 38-50 are a cross sectional view showing various grooves of FIG. 13;

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

A water draining method of the present invention is adapted for agriculture, forestry, mountains, mountainsides, protective hillsides, retaining walls, grass slopes, airport runways, highways, football fields, stone dams, and embankments, wherein a draining pipe 3 of the present invention is generally installed to a pervious bed 2.

The draining pipe 3 has irrigating and draining functions, wherein during an irrigating process, water flows into a draining channel and then flows out of a hole of the draining channel. During draining water, a siphon principle is used to draw excessive waters into the hole and then to drain the water out of the draining channel.

Figure 1:
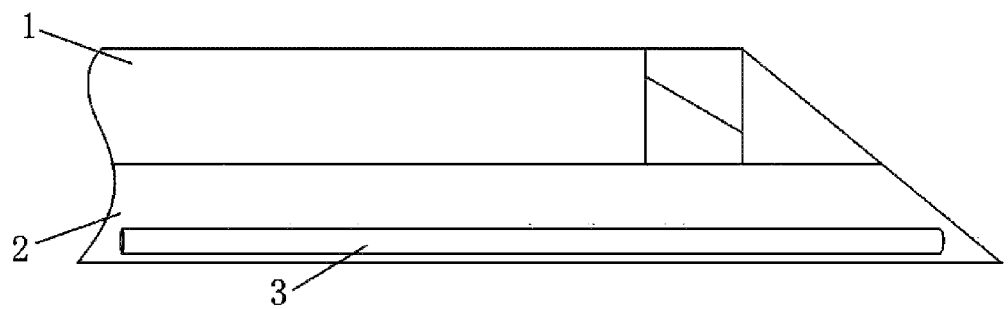
FIG. 1 is a plan view showing a water draining system used in roads in according to the present invention.
Figure 2:
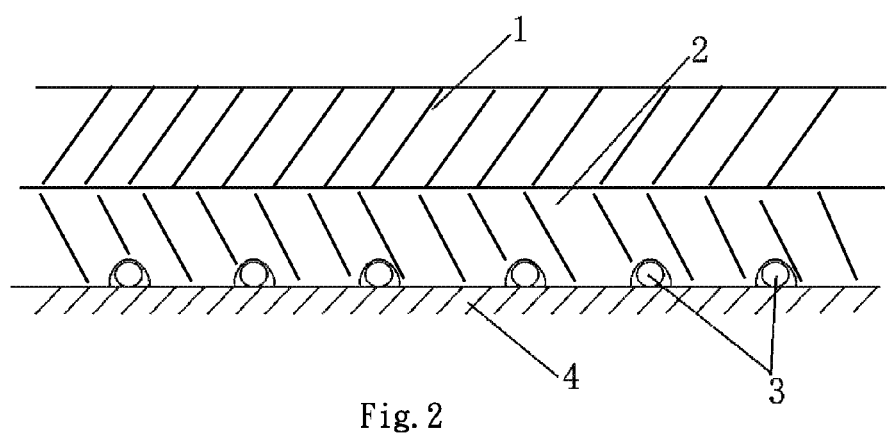
FIG. 2 is a cross sectional view of FIG. 1.
Figure 3:
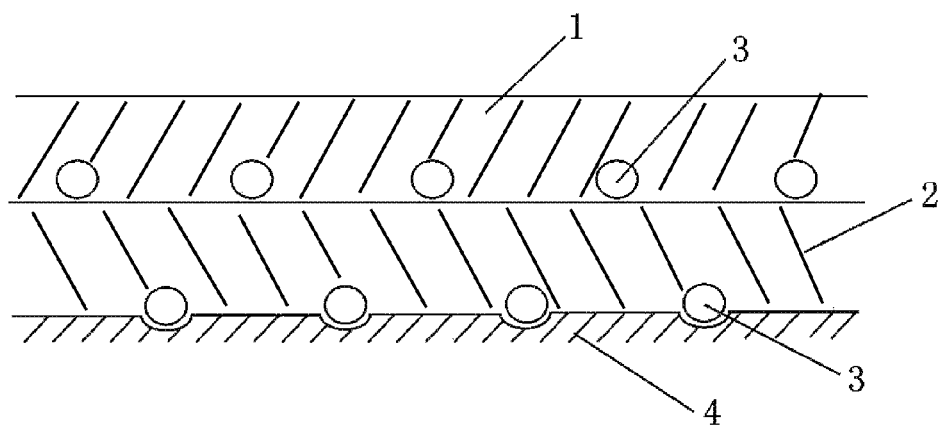
FIG. 3 is a cross sectional view showing a multi-layer draining pipe.

The draining pipe 3 is adapted for mountains, mountainsides, protective hillsides, retaining walls, grass slopes, airport runways, highways, the ground of football fields and tennis courts, building, roads, landfills, stone dams, and embankments, farms, irrigating and draining systems to collect and filter water. In a first embodiment of the present invention, as shown in FIGS. 1-3, a road draining structure is comprised of an asphalt or concrete layer 1 and a previous bed 2, a draining pipe 3 is arranged in the asphalt or concrete layer 1, the previous bed 2, and a base layer 4. The road draining structure also allows to be used in the irrigating and draining system of the farm.

Figure 4:
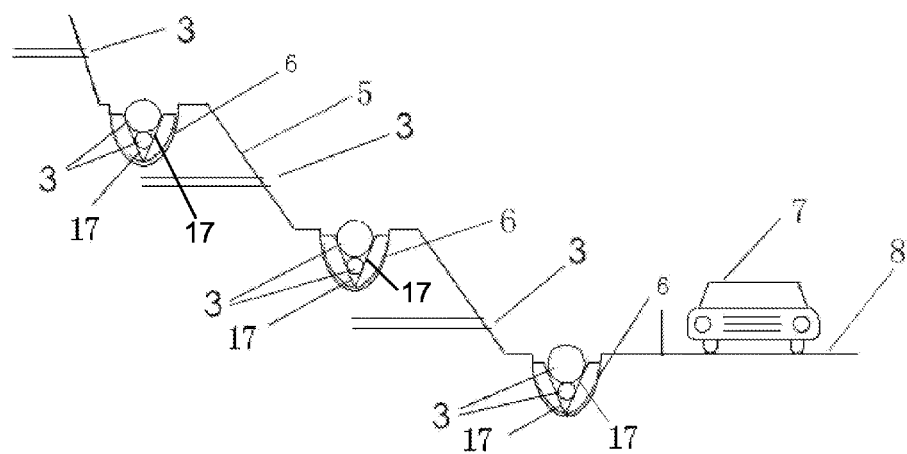
FIG. 4 is a plan view showing a water draining system used in protective hillsides of highways in according to the present invention.

In a second embodiment of the present invention, as shown in FIG. 4, a water draining structure used in roads is comprised of a draining ditch 6 and a plurality of draining pipes 3 of a protective slope 5, wherein the protective slope on one side of a highway 8 are arranged the draining pipes 3, each draining pipe 3 includes an outflow end to correspond to the draining ditch 6 in which a holder 17 is fixed to support the draining pipe 3.

Figure 5:
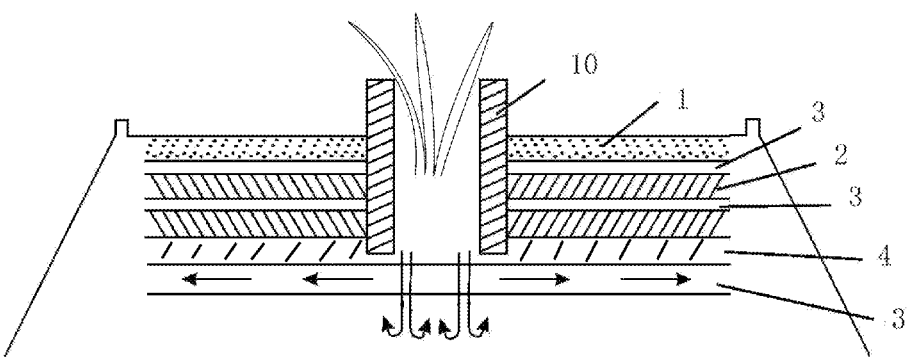
FIG. 5 is a cross sectional view showing a water draining system used in a central isolating zone and a green zone of a road.

In a third embodiment of the present invention, as shown in FIG. 5, a water draining system used in a central isolating zone and a green zone of a road is comprised of a closing wall 10 and a base layer 4, wherein on two sides of the closing wall 10 and on a bottom of the base layer 4 are arranged draining pipes 3, and a distance between each two draining pipes 3 is determined based on requirement.

The draining pipe 3 is comprised of a water draining passage 40 and a groove 100, and the groove 100 is disposed in the water draining passage 40 longitudinally, the water draining passage 40 is made of various materials (such as PVC or PE plastic tube member or transparent plastic) and formed in a circle, horse-shoe, ellipse, polygon, petal, a combination of arc and V, or a combination of arc and U shape. A tank member 31 is the groove 100 or a U-shape slot, the V-shaped groove 100 includes a square orifice 101 fixed on an open surface 102 thereof and formed in a circle or square shape, the water draining channel 40 includes a slot 401 disposed on a lower portion thereof, and between the open surface 102 of the V-shaped groove 100 and an inner wall of the water draining passage 40 is formed a chamber, wherein on the V-shaped 100 and the inner wall of the water draining passage 40 is defined a tank member 31, beneath the V-shaped groove 100 and the inner wall of the water draining passage 40 is defined a draining channel 32 having the slot 401 arranged thereon.

Figure 13:
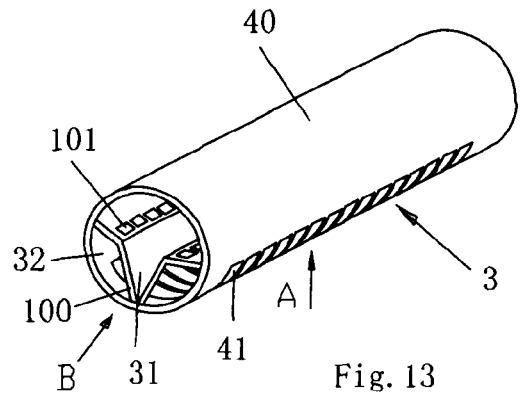
FIG. 13 is a perspective view showing a draining pipe of FIG. 1.

In a fourth embodiment of the present invention, as shown in FIG. 13, a cross section of a draining pipe is circular and includes a V-shaped groove disposed on a bottom thereof, wherein two V-shaped open surfaces of the draining pipe are sealed with an inner wall of a watering draining channel, and a V-shaped bottom end of the draining pipe is connected with a bottom surface of the watering draining channel, between a V-shaped side of the draining pipe and the inner wall of the watering draining channel is defined a closed tank member, between the open surface of the draining pipe and a bottom surface of the inner wall of the watering draining channel is defined a closed draining channel, the open surface of the draining pipe includes a square orifice mounted thereon, and the draining channel includes a slot formed thereon to correspond to the orifice or to space apart from each other.

Figure 14:
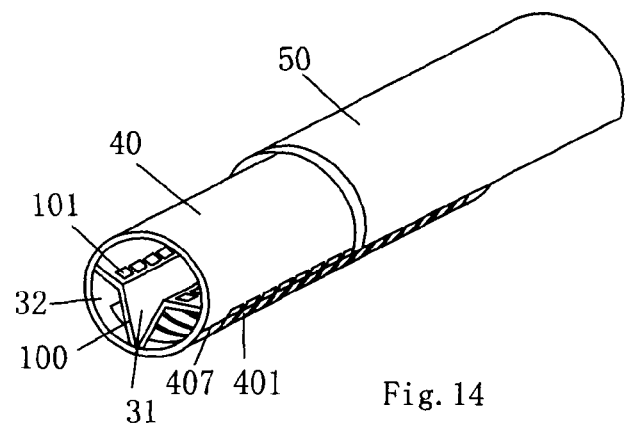
FIG. 14 is a perspective view showing a strengthening hose being fitted to a water draining passage.

In a fifth embodiment of the present invention, as shown in FIG. 14, the structure of this embodiment is the same as that of the first embodiment, and a strengthening hose 50 is fitted to a water draining passage 40 to reinforce the water draining passage 40, thus preventing the water draining passage from deformation at exterior pressure, and the strengthening hose 50 is a semi-circle shape to be retained onto a locking side 407 of the water draining passage 40 by using its two sides.

Figure 15:
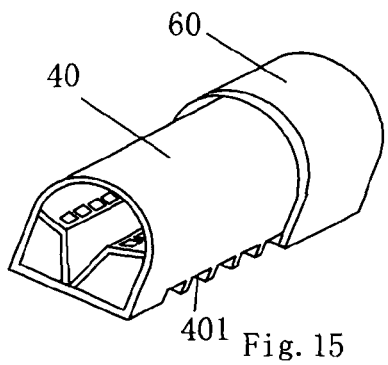
FIG. 15 is a perspective view showing the water draining passage being formed in a combined circle and square shape.

In a sixth embodiment of the present invention, as shown in FIG. 15, a cross section of the water draining passage 40 is formed in a combined circle and square shape, and between a connecting gap of the water draining passages 40 is defined a sealing member 60 to prevent water from leaking.

Figure 16:
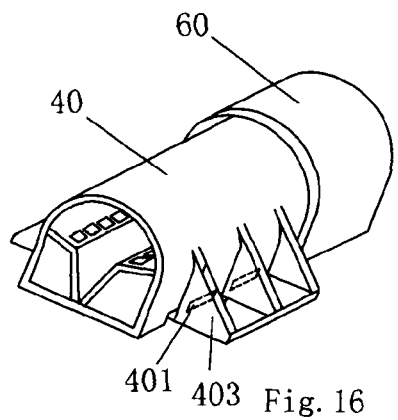
FIG. 16 is a perspective view showing the water draining passage being changed from FIG. 13.

In a seventh embodiment of the present invention, as shown in FIG. 16, a water draining passage 40 includes two reinforcing elements 403 fixed on two sides thereof to position the water draining passage 40.

Figure 17:
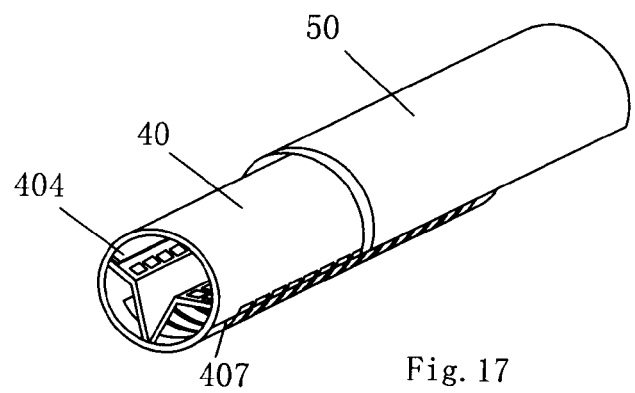
FIG. 17 is a perspective view showing positioning member being fixed to a water draining passage.

In an eighth embodiment of the present invention, as shown in FIG. 17, a water draining passage 40 is assembled with a groove 100, and the water draining passage 40 includes two symmetrical positioning members 404 secured therein so that the groove 100 is inserted to the water draining passage 40 along the positioning members 404.

Figure 18:
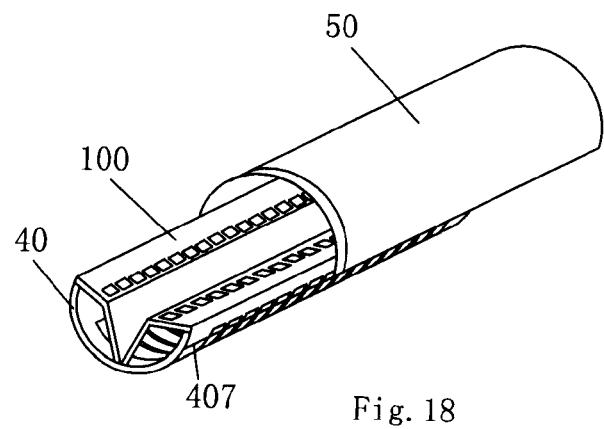
FIG. 18 is a perspective view showing the water draining passage being a semicircle shape.
Figure 19:
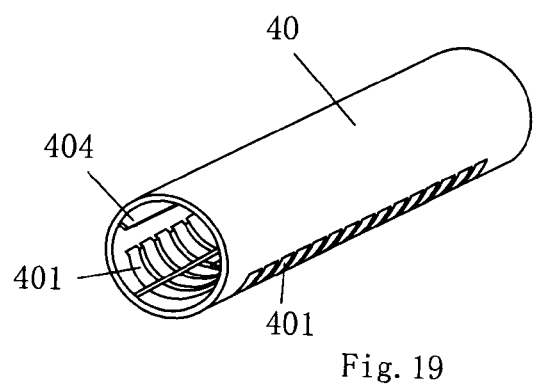
FIG. 19 is a perspective view showing the water draining passage of FIG. 13.
Figure 20:
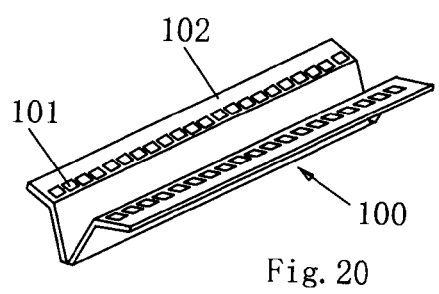
FIG. 20 is a perspective view showing a groove being formed in a V-shaped.
Figure 21:
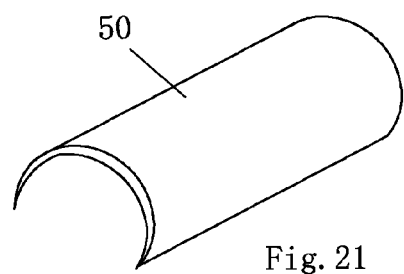
FIG. 21 is a perspective view showing a strengthening hose of FIG. 14.
Figure 22:
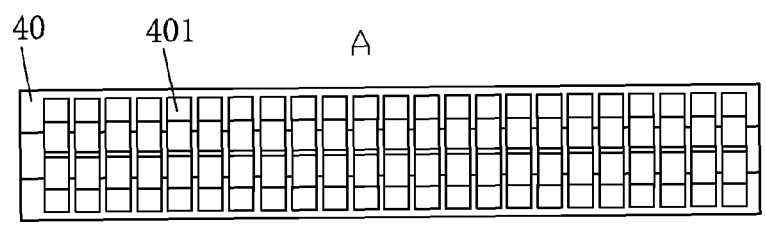
FIG. 22 is a plan view showing slots of FIG. 13.
Figure 23:
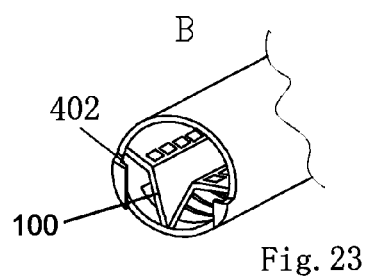
FIG. 23 is a perspective view showing a retaining structure of FIG. 13.
Figure 24:
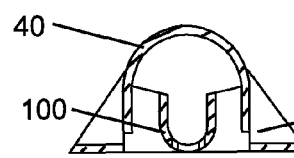
FIGS. 24-27 are a cross sectional view showing the shapes of the groove of FIG. 16.
Figure 26:
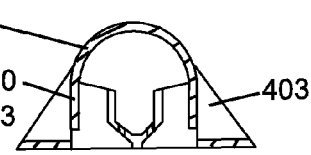
Figure 25:
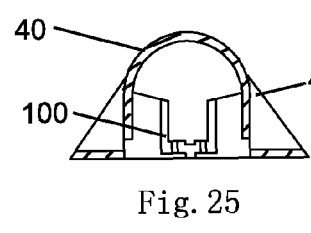
Figure 27:
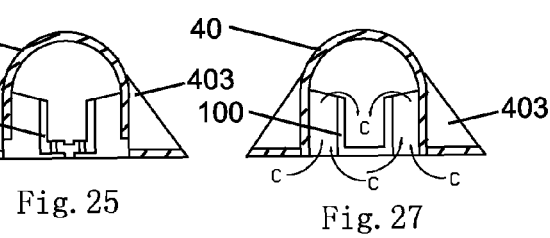

In a ninth embodiment of the present invention, as shown in FIG. 18, a cross section of the water draining passage 40 is a semicircle shape, and a strengthening hose 50 is fitted to the water draining passage 40.

In a tenth embodiment of the present invention, as shown in FIG. 29, a structure of a water draining passage is identical to that of the fourth embodiment, and the water draining passage is formed in a horse-shoe shape to facilitate an installation.

In an eleventh embodiment of the present invention, as shown in FIG. 30, a structure of a water draining passage is identical to that of the fourth embodiment, and the water draining passage is formed in an U shape to facilitate an installation.

In a twelfth embodiment of the present invention, as shown in FIG. 31, a water draining passage is deformed from the U-shaped groove of the eleventh embodiment.

In a thirteenth embodiment of the present invention, as shown in FIG. 38, a structure of a water draining passage is identical to that of the fourth embodiment, and a groove is formed in a V shape.

In a fourteenth embodiment of the present invention, as shown in FIG. 39, a structure of a water draining passage is identical to that of the fourth embodiment, and a groove is formed in an opening shape.

In a fifteenth embodiment of the present invention, as shown in FIG. 41, a structure of a water draining passage is identical to that of the fourth embodiment, and a groove is formed in an open square shape, and includes an aperture 701 disposed on a bottom thereof.

In a sixteenth embodiment of the present invention, as shown in FIG. 35, a water draining passage 40 is assembled with a groove 100, and includes four symmetrical positioning members 404 mounted therein, and includes a rib 405 mounted on a bottom thereof, the positioning member 404 includes an insertion dent 406 formed therein, and the groove 100 includes a trough 103 disposed on a top end thereof and is inserted to the water draining passage 40 along the insertion dent 406 and the rib 405.

In a seventeenth embodiment of the present invention, as shown in FIG. 43, a water draining passage 40 includes three rows of outflow tunnels 70 longitudinally arranged therein, and between the outflow tunnels 70 are draining channels, wherein each outflow tunnel includes apertures 701.

As shown in FIG. 42, a structure of a water draining passage is identical to that of the eighth embodiment, and there is only one row of the outflow tunnel 70 arranged in the water draining passage.

In an eighteenth embodiment of the present invention, as shown in FIG. 44, a structure of a water draining passage is identical to that of the seventh embodiment, and there are two rows of the outflow tunnels 70 arranged in the water draining passage.

In a nineteenth embodiment of the present invention, as shown in FIG. 45, a water draining passage is changed from the three rows of the outflow tunnels 70 in the seventeenth embodiment.

In a twentieth embodiment of the present invention, as shown in FIG. 46, a water draining passage includes plural rows of apertures, each having a top portion higher than a bottom surface of the water draining pipe.

In a twenty-first embodiment of the present invention, as shown in FIG. 47, a water draining pipe includes plural rows of apertures 701 disposed on a bottom surface thereof.

Figure 48:
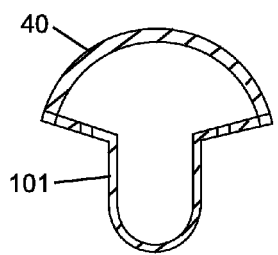

In a twenty-second embodiment of the present invention, as shown in FIG. 48, a water draining pipe is formed in a combined arc and U shape.

Figure 49:
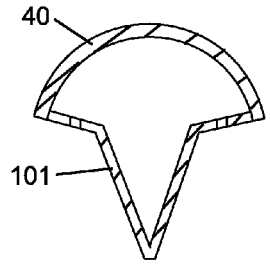

In a twenty-third embodiment of the present invention, as shown in FIG. 49, a water draining passage is formed in a combined arc and V shape.

Figure 50:
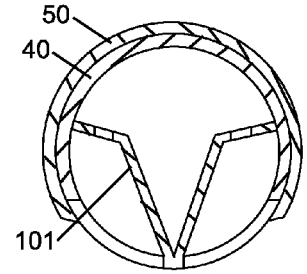

In a twenty fourth embodiment of the present invention, as shown in FIG. 50, a draining pipe includes a semicircle strengthening hose fitted thereon.

Figure 51:
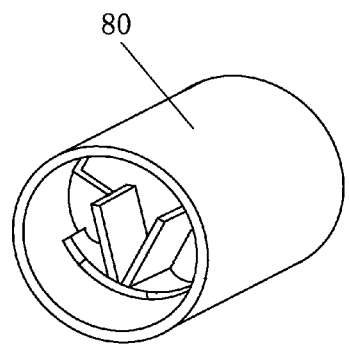
FIG. 51 is a perspective view of a joint of the present invention.
Figure 52:
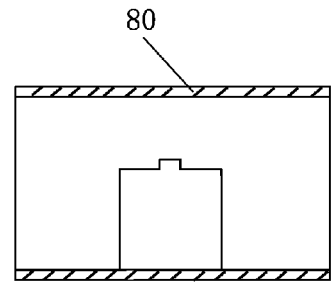
FIG. 52 is a cross sectional view of FIG. 51.

In a twenty-fifth embodiment of the present invention, as shown in FIG. 51, a draining pipe is connected with another draining pipe via a connecting member and a joint 80.

Figure 53:
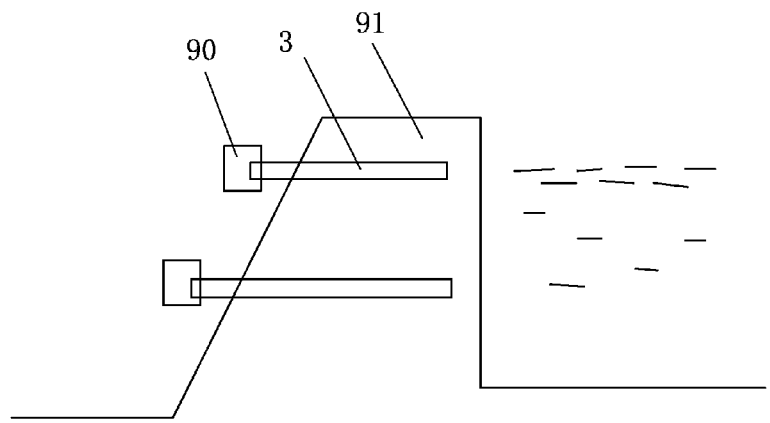
FIG. 53 is a plan view showing the operation of the draining pipe and a warning device according to the present invention.

In a twenty-sixth embodiment of the present invention, as shown in FIG. 53, draining pipes 3 are inserted to an embankment 91 of a reservoir or a river, and includes a warning device 90 connected to one end thereof, hence when water amount stored in the embankment is over a certain value, the water amount flowing from the draining pipe 3 becomes increased, and then the warning device 90 transfers a flowing signal into data so that the flowing signal is transmitted to a control center and a cell phone, thereby making warning signals.

Figure 6:
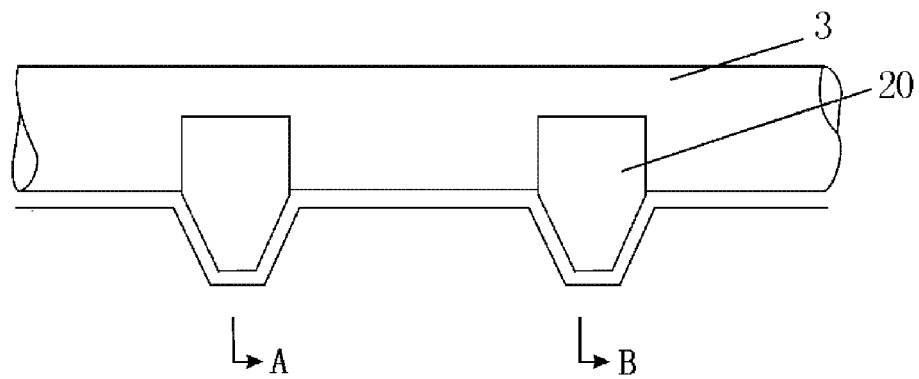
FIGS. 6-8 are a plan view showing a draining pipe of FIG. 1.
Figure 7:
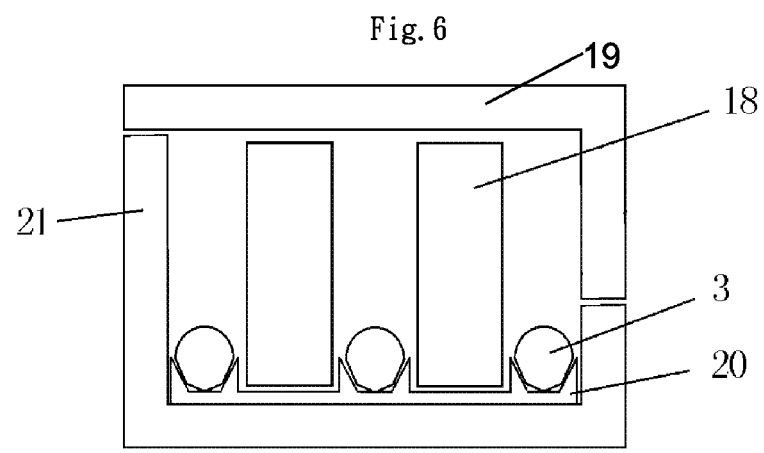
Figure 8:
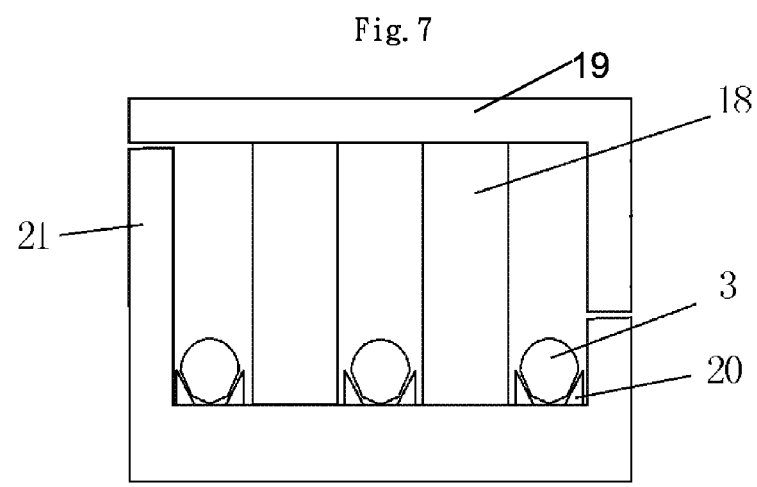

In a twenty-seventh embodiment of the present invention, as shown in FIGS. 6-8, a support member 18, an upper cover 19, a bracket 20, and a trench 21 are assembled together, and between the trench 21 and draining pipes 3 is defined at least one bracket 20 having at least one receiving member to receive the draining pipes 3.

Figure 9:
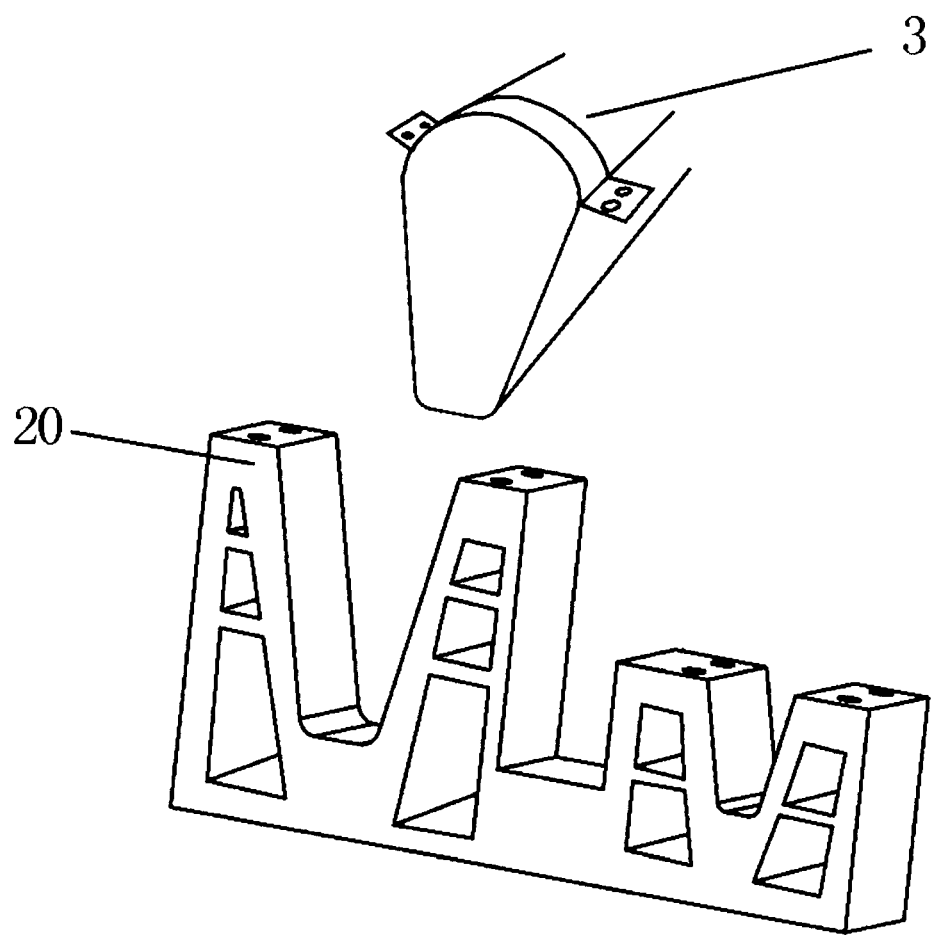
FIG. 9 is a perspective view showing a double-bracket of FIGS. 6-8.

In a twenty-eighth embodiment of the present invention, as shown in FIG. 9, a V-shaped bracket 20 includes two V-shaped rooms to receive a draining pipe 3, and between the two V-shaped rooms is defined a retaining recess to retain a support member.

Figure 10:
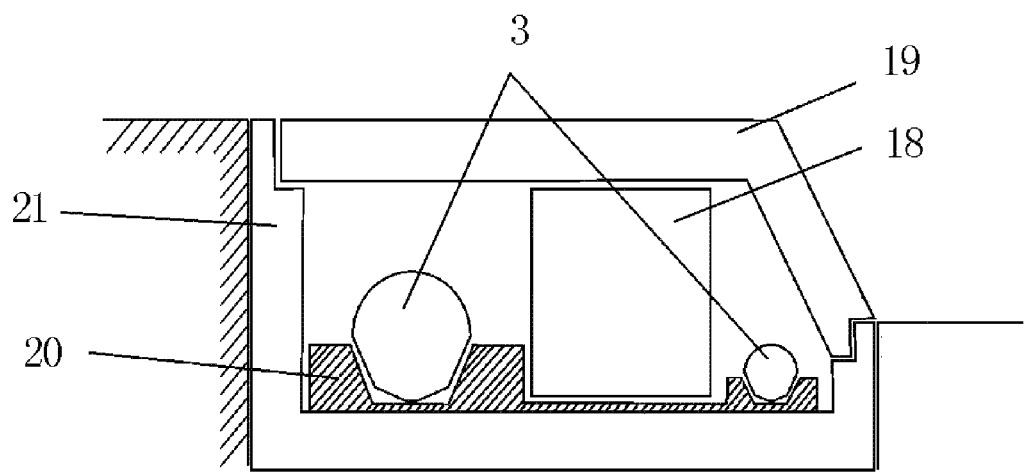
FIG. 10 is a plan view showing a U-shaped bracket of FIGS. 6-8.

In a twenty-ninth embodiment of the present invention, as shown in FIG. 10, an upper cover 19 is engaged to a trench 21 having two U-shaped brackets 20 laterally disposed therein, and between the two U-shaped brackets 20 are fixed a draining pipe 3 and a support member 18.

Figure 11:
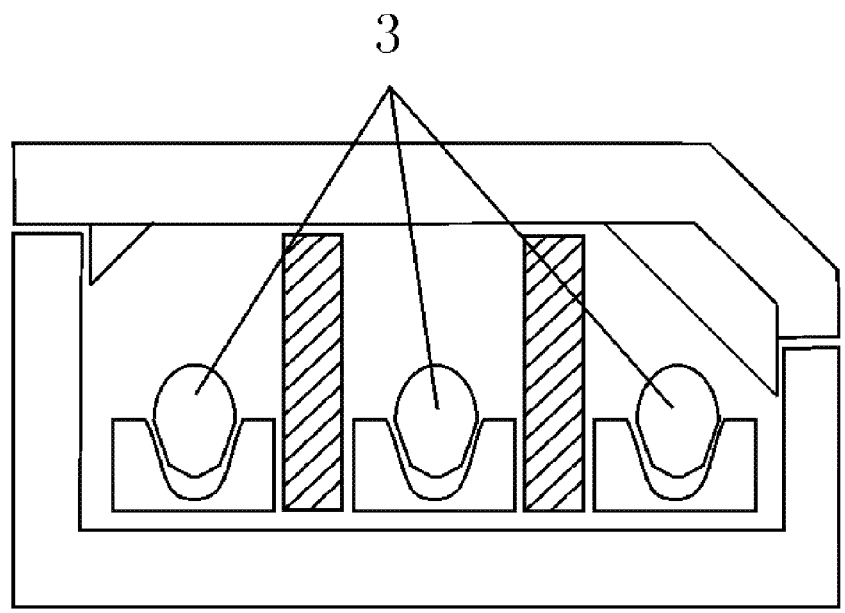
FIG. 11 is a plan view showing a support member of FIGS. 6-8.

In a thirtieth embodiment of the present invention, as shown in FIG. 11, three U-shaped brackets 20 are received in a trench 21, and each bracket 20 includes a draining pipe 3 disposed therein, among the three brackets 20 are defined two support members 18.

Figure 12:
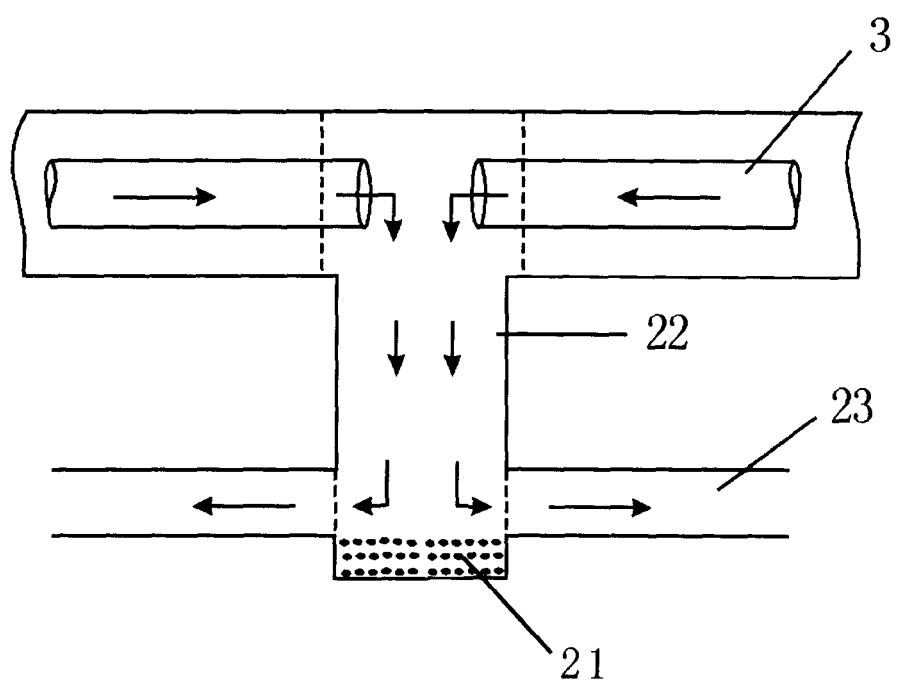
FIG. 12 is a plane view showing a water draining structure used in a vertical road of FIGS. 6-8.

In a thirty-first embodiment of the present invention, as shown in FIG. 12, water flows into a drain well 22 through a draining pipe 3 of a draining structure of vertical roads, wherein impurities enters a deposit layer and water is drained via a drain tube 23. Also, water flowing from a draining pipe 3 is guided to an outer piping or canal based on requirement.

A diameter of the draining pipe 3 is calculated on a basis of flowing amount of reverse osmosis. The draining pipe 3 is mounted in the asphalt layer or the concrete layer and the pervious bed 2 to prevent the draining pipe 3 from being damaged by vehicles or construction machines. During building a new road, a bottom of the draining pipe 3 has to be flushed with a bottom of the asphalt layer or the concrete layer and the pervious bed 2; and during rebuilding the road, a center of the draining pipe 3 has to be lower than a top surface of the asphalt layer or the concrete layer and the pervious bed 2, and in a frozen area, the center of the draining pipe 3 has to be over a frozen depth.

The draining pipe has irrigating and draining functions, and during irrigating process, water flows into the draining channel and then flows out of the hole. During draining process, excessive water is drawn to the draining channel from the hole and drained outward.

Thereby, the present invention is adapted for agriculture, forestry, mountains, mountainsides, protective hillsides, retaining walls, grass slopes, airport runways, highways, football fields, stone dams, and embankments, etc., so as to obtain rain collecting, impurities filtering, irrigating, draining, anti-leaking, and warning functions.

While we have shown and described various embodiments in accordance with the present invention, it is clear to those skilled in the art that further embodiments may be made without departing from the scope of the present invention.

What is claimed is:

1. A water draining pipe, comprising a water draining passage and a joint, the watering draining passage including an inflow end and an outflow end, and includes a V-shaped groove longitudinally disposed therein, and the watering draining passage also includes orifices formed on a lower end thereof to communicate with a draining channel and a tank member, wherein the V-shaped groove includes an opening surface to connect with an inner wall of the water draining passage, and a bottom end of the V-shaped groove couples with a bottom surface of the inner wall of the water draining passage, the opening surface includes the orifices arranged thereon, and on a lower end of the water draining passage are provided slots to correspond to square orifices, wherein the water draining passage includes two symmetrical positioning members secured therein so that the groove is inserted into the water draining passage along the positioning members.

2. The water draining pipe, as claimed in claim 1, wherein the water draining passage is formed in a circle or a horseshoe shape.

3. The water draining pipe, as claimed in claim 1, wherein the water draining passage is formed in an ellipse, polygon, petal, a combination of arc and V, or a combination of arc and U shape.

4. The water draining pipe, as claimed in claim 1, wherein the water draining passage includes a vertical outflow tunnel longitudinally arranged therein in a plurality of rows, and the outflow tunnel includes apertures fixed therein.

5. The water draining pipe, as claimed in claim 1, wherein a strengthening hose is fitted to the water draining passage to reinforce the water draining passage, and the strengthening hose is a semi-circle shape to be retained onto a locking side of the water draining passage by using two sides of the water draining passage.

6. The water draining pipe, as claimed in claim 1, wherein the draining pipe is connected with another draining pipe via a connecting member and the joint.

7. A water draining pipe, comprising a water draining passage and a joint, the watering draining passage including an inflow end and an outflow end, and includes a V-shaped groove longitudinally disposed therein, and the watering draining passage also includes orifices formed on a lower end thereof to communicate with a draining channel and a tank member, wherein the V-shaped groove includes an opening surface to connect with an inner wall of the water draining passage, and a bottom end of the V-shaped groove couples with a bottom surface of the inner wall of the water draining passage, the opening surface includes the orifices arranged thereon, and on a lower end of the water draining passage are provided slots to correspond to square orifices, wherein the water draining passage includes four symmetrical positioning members mounted therein, and includes a rib mounted on a bottom thereof, each of the positioning members includes an insertion dent formed therein, and the groove includes a trough disposed on a bottom end thereof and is inserted to the water draining passage along the insertion dent and the rib.

8. The water draining pipe, as claimed in claim 7, wherein the water draining passage is formed in a circle or a horse-shoe shape.

9. The water draining pipe, as claimed in claim 7, wherein the water draining passage is formed in an ellipse, polygon, petal, a combination of arc and V, or a combination of arc and U shape.

10. The water draining pipe, as claimed in claim 7, wherein the water draining passage includes a vertical outflow tunnel longitudinally arranged therein in a plurality of rows, and the outflow tunnel includes apertures fixed therein.

11. The water draining pipe, as claimed in claim 7, wherein a strengthening hose is fitted to the water draining passage to reinforce the water draining passage, and the strengthening hose is a semi-circle shape to be retained onto a locking side of the water draining passage by using two sides of the water draining passage.

12. The water draining pipe, as claimed in claim 7, wherein the draining pipe is connected with another draining pipe via a connecting member and the joint.

13. A water draining pipe, comprising a water draining passage and a joint, the watering draining passage including an inflow end and an outflow end, and includes a V-shaped groove longitudinally disposed therein, and the watering draining passage also includes orifices formed on a lower end thereof to communicate with a draining channel and a tank member, wherein the water draining passage includes two reinforcing elements fixed on two sides thereof to position the water draining passage, and includes the V-shaped groove longitudinally disposed therein, and the V-shaped groove includes an opening surface to connect with an inner wall of the water draining passage, and a bottom end of the V-shaped groove couples with a bottom surface of the inner wall of the water draining passage, the opening surface includes the orifices arranged thereon, and on a lower end of the water draining passage are provided slots to correspond to square orifices.

14. The water draining pipe, as claimed in claim 13, wherein between a connecting gap of the water draining passages is defined a sealing member.

15. The water draining pipe, as claimed in claim 13, wherein the water draining passage is formed in a circle or a horse-shoe shape.

16. The water draining pipe, as claimed in claim 13, wherein the water draining passage is formed in an ellipse, polygon, petal, a combination of arc and V, or a combination of arc and U shape.

17. The water draining pipe, as claimed in claim 13, wherein the water draining passage includes a vertical outflow tunnel longitudinally arranged therein in a plurality of rows, and the outflow tunnel includes apertures fixed therein.

18. The water draining pipe, as claimed in claim 13, wherein a strengthening hose is fitted to the water draining passage to reinforce the water draining passage, and the strengthening hose is a semi-circle shape to be retained onto a locking side of the water draining passage by using two side of the water draining passage.

19. The water draining pipe, as claimed in claim 13, wherein the draining pipe is connected with another draining pipe via a connecting member and the joint.

* * * * *